US006101000A

United States Patent [19]

Murray et al.

[11] Patent Number: 6,101,000

[45] Date of Patent: Aug. 8, 2000

[54] PHOTOGRAPHIC PROCESSING APPARATUS AND METHOD

[75] Inventors: Thomas J. Murray, Mt. Morris; Walter C. Slater, Prattsburgh; Brian J. Joseph, Spencerport, all of N.Y.

[73] Assignee: Eastman Kodak Company, Rochester, N.Y.

[21] Appl. No.: 09/016,238

[22] Filed: Jan. 30, 1998

[51] Int. Cl.[7] .................................................... H04N 1/387

[52] U.S. Cl. .......................... 358/1.9; 358/453; 358/487; 382/309

[58] Field of Search ............................ 358/1.9, 453, 487, 358/506, 527, 538, 452, 537; 382/275, 309, 311

[56] References Cited

U.S. PATENT DOCUMENTS

| | | | |
|---|---|---|---|
| 4,097,892 | 6/1978 | Balding . | |
| 4,364,084 | 12/1982 | Akimoto et al. . | |
| 4,602,294 | 7/1986 | Yamada . | |
| 4,649,436 | 3/1987 | Nakagawa et al. . | |
| 4,751,583 | 6/1988 | Levine . | |
| 4,816,903 | 3/1989 | Utsuda et al. | 358/506 |
| 5,019,858 | 5/1991 | Suzuki . | |
| 5,101,286 | 3/1992 | Patton . | |
| 5,185,666 | 2/1993 | Capitant et al. . | |
| 5,410,415 | 4/1995 | Parulski et al. . | |
| 5,436,979 | 7/1995 | Gray et al. . | |
| 5,512,396 | 4/1996 | Hicks . | |
| 5,546,196 | 8/1996 | Huot et al. . | |
| 5,644,647 | 7/1997 | Cosgrove et al. | 382/275 |
| 5,649,260 | 7/1997 | Wheeler et al. . | |
| 5,652,936 | 7/1997 | Klees et al. . | |
| 5,664,253 | 9/1997 | Meyers . | |
| 5,694,634 | 12/1997 | Patton et al. . | |

FOREIGN PATENT DOCUMENTS

| | | |
|---|---|---|
| 0 054 848 | 6/1982 | European Pat. Off. . |
| 0 129 446 | 12/1984 | European Pat. Off. . |

*Primary Examiner*—Thomas D. Lee
*Attorney, Agent, or Firm*—Gordon M. Stewart

[57] ABSTRACT

A method of processing photographic media carrying a plurality of images, and an apparatus which can execute the method. The media is scanned to obtain image signals corresponding to the images. Image characteristics are determined from scanned image signals. Image characteristics for scanned images are automatically compared with one or more predetermined characteristic values to classify as passed or suspect images those images which do or do not meet one or more predetermined characteristics. Simulated images are displayed based on the scanned image signals such that any suspect images are apparent to a user. User inputs are obtained for any suspect images, and any suspect image signal is corrected in response to the user input for that image. The image signals are forwarded to an output device.

32 Claims, 7 Drawing Sheets

PHOTOGRAPHIC PROCESSING APPARATUS AND METHOD

FIELD OF THE INVENTION

This invention relates generally to the field of photography, and in particular to processing of media carrying images.

BACKGROUND OF THE INVENTION

In typical photofinishing operations a user (sometimes referenced as a customer) delivers one or more film rolls carrying corresponding exposed filmstrips, to a processing laboratory to have them chemically developed and hardcopies of the images (such as paper prints) prepared. Individual filmstrips are spliced together end to end to form a larger roll which is easily handled by automated equipment. Following chemical processing of the roll to yield permanent images on the filmstrips, each image is pre-scanned at high speed to obtain image characteristics, such as color and density. These characteristics are passed to an optical printer which uses the characteristic data to adjust exposure conditions (such as duration, color filters, and the like) of an image frame on the developed filmstrip which is optically projected onto a photosensitive paper. The exposed photosensitive paper is then chemically developed to yield the final hardcopy prints. In modern photofinishing operations, images may optionally also be scanned to provide an image signal corresponding to each image on the film. These image signals are usually stored on a medium such as a magnetic or optical disk and provided to the customer, or made available to the customer over the Internet, and may be used then or at a later time to provide a hardcopy output. When the customer order is completed, the film is cut into strips (for 35 mm film) or reattached to a film cassette (for Advanced Photo System films), the exposed paper is cut into individual prints, and the film, completed prints and any other media (such as a disk bearing scanned images) are packaged at a finishing station and the order is then complete. Recently it has been described that in the foregoing type of photofinishing operation, the optical printer can be replaced with a digital printer which will print the images directly from the scanned data.

During fulfillment of the customer order, exposed prints on the photosensitive paper from the printer are visually inspected by an operator for errors (such as color or density errors) or rejects (such as images in which a customer's hand covered the camera lens). This is accomplished by unwinding an exposed roll of paper from the printer past a flat viewing area at which the operator is positioned. If prints are visually out of specification, the operator will physically so mark them with a sticker, grease pen, or some other means. The marks may include suggested corrections. The marks alert a finishing station operator to set aside the prints (and the entire order) so it can be corrected ("made over"). Prints marked as errors or rejects are discarded and not charged to the customer. Customer orders with errors or rejects are set aside by the finishing station operator and are sent to a laminating station. Alternatively, the suggested corrections could be transferred electronically to the printer.

At the laminating station cut strips of film are laminated together end to end, as required, and each order laminated end to end to provide a laminated reel of orders requiring re-processing. The laminating station operator enters the corrections required for each image into a computer connected to the printer, and these orders are then re-printed using such printer corrections. The resulting prints are then cut as before, and the order re-assembled for completion. While laminating is not required in the case of errors or rejects in Advanced Photo System ("APS") films, re-printing is still required.

A difficulty with the above procedure is that the printer is unable to make proper adjustments for every image prior to printing, based on the received image characteristics. Thus, errors or rejects will still occur. This necessitates the tedious, time consuming, and expensive manual screening of all prints as described above and sending errors or defects through the lamination and re-printing process described above. Furthermore, a complete customer order is held up if even just one image has an error or is defective. These problems can be particularly serious in wholesale photofinishing labs where film is processed at the rate of 200 images per minute or more (typically greater than 250 images/minute).

It would be desirable then, particularly at film processing rates encountered in a wholesale photofinishing environment, to reduce screening, lamination and re-printing of images as much as possible and to reduce delays in customer orders due to correcting images with error or defects.

SUMMARY OF THE INVENTION

The present invention then, provides a method of processing photographic media (such as film or paper) carrying a plurality of images. In one aspect this method comprises:

(a) scanning the media to obtain image signals corresponding to the images;

(b) determining image characteristics from scanned image signals;

(c) automatically comparing image characteristics for scanned images with one or more predetermined characteristic values to classify as passed or suspect images those images which do or do not meet one or more predetermined characteristics;

(d) displaying simulated images based on the scanned image signals (that is, obtained directly or indirectly from the scanned image signals) such that suspect images are apparent to a user;

(e) receiving user inputs for any suspect images;

(f) correcting any suspect image signal in response to the user input for that image; and (g) forwarding the image signals to an output device.

The fact that particular simulated images being displayed are suspect images, can be made apparent to a user by any number of means. For example, only simulated images for suspect images might be routinely displayed, in which case the user will know that any simulated images displayed must be suspect images. Alternatively, both suspect and passed images could be displayed with the suspect images being distinguished from passed images by an added indicator, such as a border added around suspect images only.

The method can additionally include automatically enhancing passed images by processing passed image signals in accordance with preselected parameters. These parameters can be modified over time in response to user inputs for suspect images. Further, one or more suggested corrected images can be generated for suspect images, and displayed for an operator to select as displayed or to modify to produce the corrected image.

In a particular aspect of the above method, an image signal corresponding to a passed image scanned subsequent to an earlier scanned suspect image is forwarded to the output device, while waiting for the corrected image signal from step (f) which corresponds to that earlier scanned suspect image. In this manner, the output device such as a printer, magnetic or optical disk writer, or communication device, need not be sitting idle while an operator makes corrections to a suspect image. Such a sequence may occur, for example, in the case where the film is comprised of a batch of film orders each of one or more filmstrips carrying a series of images, the filmstrips of the batch being attached in series at their ends. In this case, image signals from passed images of an order can be forwarded to the output device until the earlier of a corrected image signal from step (f) being available or all passed image signals of an order have been forwarded. In this case also, one or more corrected image signals of an order may be forwarded to the output device prior to image signals from another order being forwarded to the output device, in order to keep output images of an order in together (without being interrupted by output images of another order). This can be particularly important where the output device is a printer, but less important if the output device provides image signals (such as a magnetic or optical disk writer).

Alternatively, in the present invention the image signals could be provided by some other means than the scanner, such as from magnetic or optical disk or from a remote terminal over a communication channel.

An apparatus which can execute methods of the present invention is also provided.

Methods and apparatus of the present invention, particularly at printing rates encountered in a wholesale photofinishing environment, can reduce total order processing time and reduce wasted material from lamination and re-printing of images, and can reduce delays in customer orders, due to correcting images with errors or defects. This can be particularly desirable in a wholesale photofinishing lab where maintaining high printing rates is required. These advantages can reduce overall cost.

DETAILED DESCRIPTION OF THE INVENTION

Figure 1:
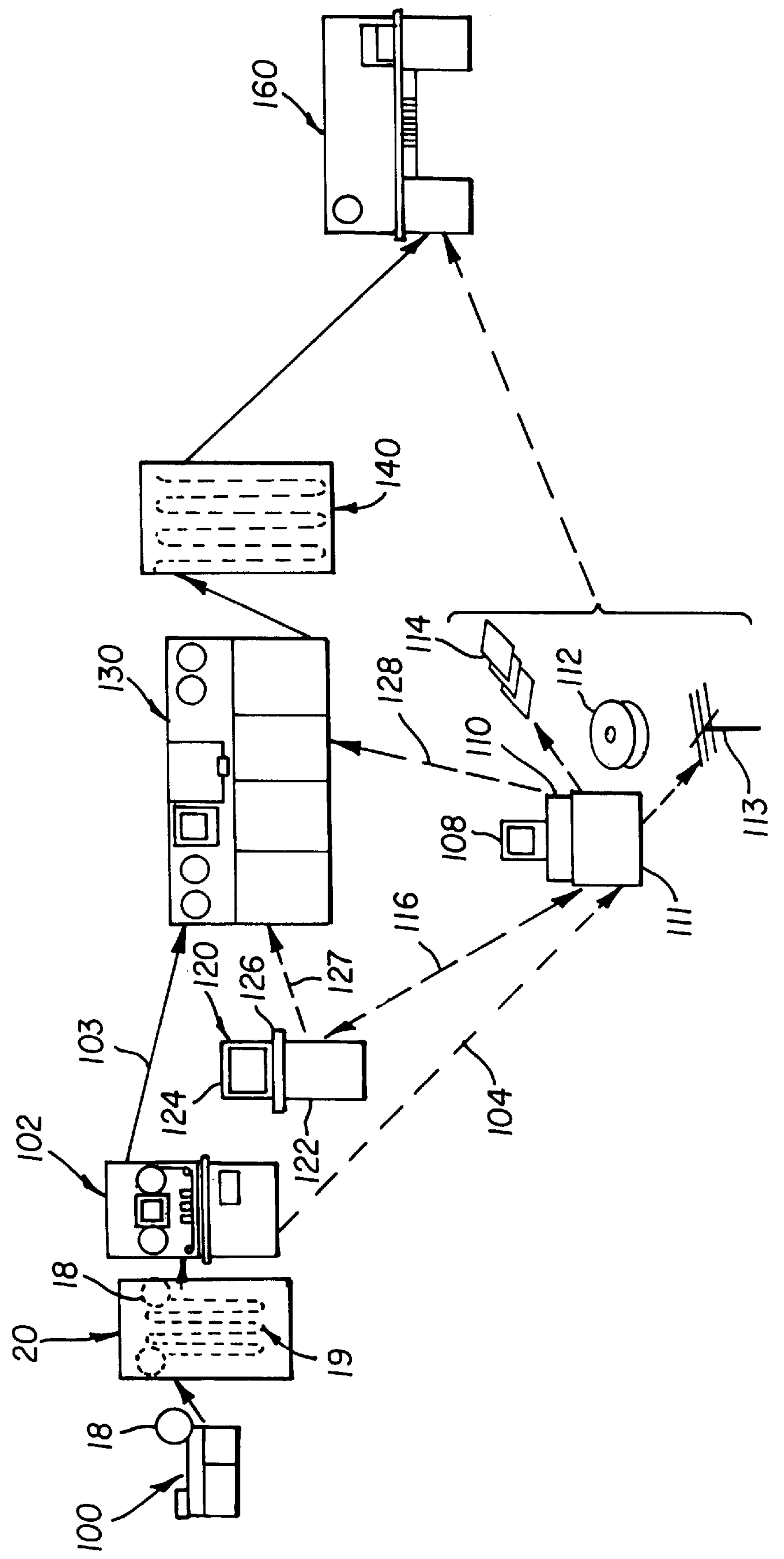
FIG. 1 schematically illustrates an apparatus of the present invention.
Figure 2:
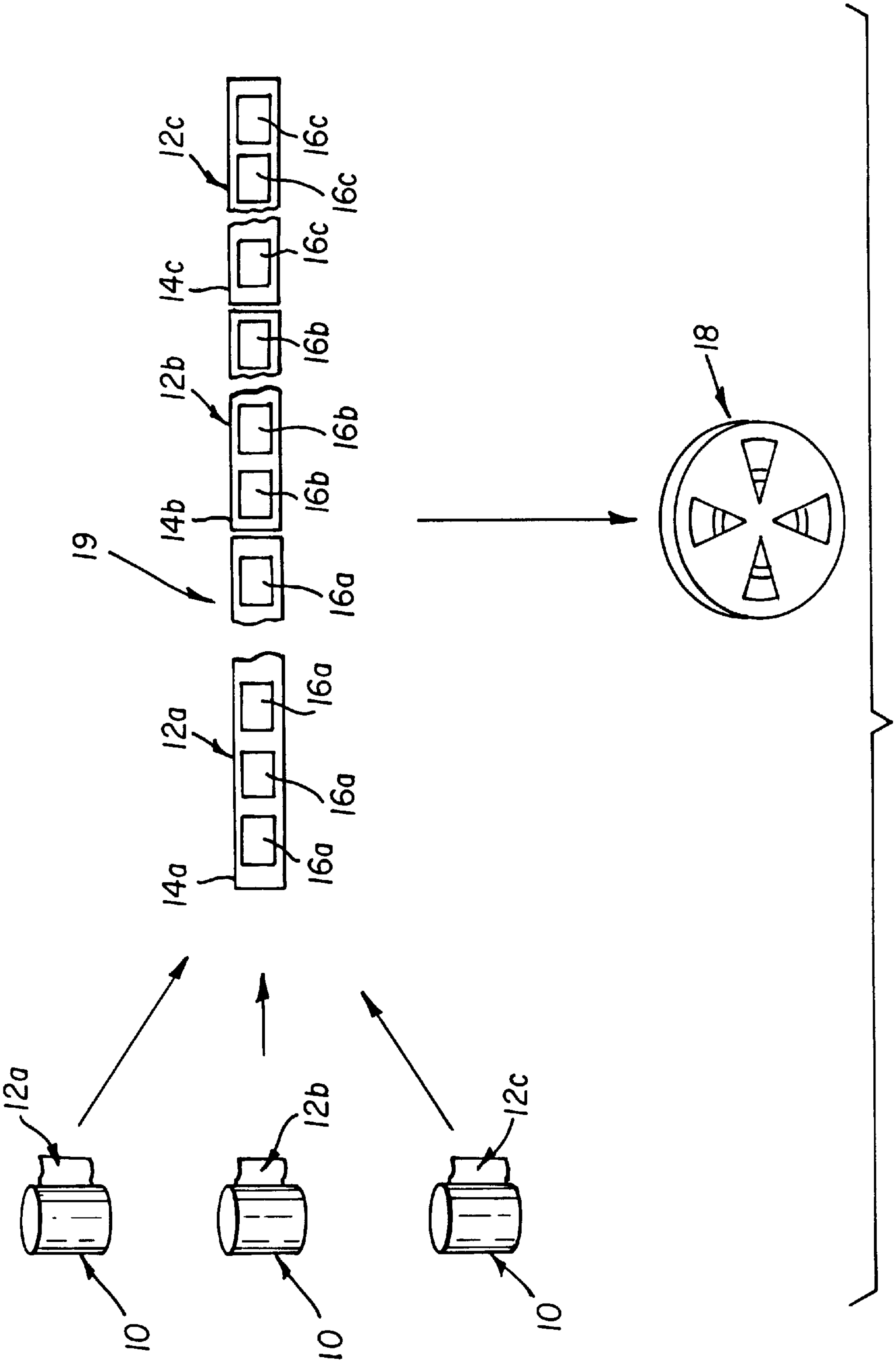
FIG. 2 illustrates a typical operation in which multiple customer filmstrips are spliced together to form a batch for processing.

Referring first to FIGS. 1 and 2, the embodiment of the apparatus shown, and the workflow, will basically be described. Details of operation of the method will then be described in connection with FIGS. 3–7.

Turning to FIGS. 1 and 2 then, the photographic processing apparatus shown includes a known type of splicer 100. Splicer 100 splices exposed light sensitive filmstrips 12*a,* 12*b,* 12*c* which have been removed from their respective light tight cassettes 10, together in a series by attaching one end 14*a* of one filmstrip 12*a* with an end 14*b* of another filmstrip 12*b*, and so on as shown in FIG. 2. Each filmstrip 12*a,* 12*b,* 12*c* is normally regarded as a single customer order (although it is possible for a single customer order to include more than one filmstrip 12*a,* 12*b,* 12*c*), and carries a plurality of exposed latent images 16*a,* 16*b,* 16*c* (for example, from 6 to 12, to 24, or to 36 images). The resulting attached series of filmstrips 12 is referenced as a film 19 which is placed on a reel 18. Film 19 is then chemically developed through a series of steps in a chemical developer 20, in a known manner, to yield permanent visible images. Each filmstrip 12*a,* 12*b,* 12*c* will typically be a negative type filmstrip yielding negative type images on a transparent base after developing by chemical developer 20, although filmstrip 12*a,* 12*b,* 12*c* and developer 20 could be of a kind which produce positive transparencies (that is, slides) also in a known manner.

A developed film 19 exiting developer 20 is then passed to a high speed scanner 102 which operates at 200 images/minute or greater. Scanner 102 includes a film gate at which each image 16*a,* 16*b,* 16*c* of film 19 can be successively positioned to receive light from a light source, which then passes through image 16*a,* 16*b,* 16*c* and a subsequent lens system to fall upon an image sensor. The image sensor can be a line sensor or area array sensor. Appropriate electronics (including an analog to digital converter) in the scanner 102 convert the sensor signals to digital signals. The output of scanner 102 then, are digital image signals corresponding to each image 16*a,* 16*b,* 16*c* on film 19. Scanner 102 should be capable of scanning images 16*a,* 16*b,* 16*c* with a reasonably high resolution, such as at least 400×200 pixels over the area of images 16*a,* 16*b,* 16*c* (such as at least 600×400 pixels) and preferably at least 1000×1500 pixels (and most preferably at least 2000×3000 pixels). Scanners of the foregoing type are well known in the art and need not be described further. Scanner 102 can also provide image characteristic data on such characteristics as image density, color balance, or contrast. This data can be obtained from scanned image signals provided by a separate lower resolution scanner section (not shown) within scanner 102, or can be generated from the previously obtained higher resolution image signals. Thus, the scanned image signals from which prints will eventually be obtained, need not be (but preferably are) the same image signals from which the image characteristics are obtained. Alternatively, such image characteristic data can be generated in an Image Data Manager ("IDM") 110 described below, from image signals.

Image signals (and optionally image characteristic data) are passed over communication network connection 104 from scanner 102 to the IDM. IDM 110 includes a processor and a connected monitor 108 which allows an operator to view various operating parameters of IDM 110. IDM 110 may, for example, be a number of general purpose microprocessors operating in parallel and suitably programmed to execute the required steps of the method of the present invention, or may be equivalent hard wired circuits in whole or in part. IDM 110 is connected through network connections 116 and 128 with an image preview station 120 and a high speed printer 130, respectively. A media output station 111 connected to IDM 110, which provides image signal outputs on magnetic disks 114, optical disks 112, or over a communication channel 113 (which may be wire, fiber optic cable, or wireless) to the Internet.

Image preview station 120 includes a processor 122 and connected monitor 124 (sometimes referenced as a screen) and operator input device 126 in the form of a keyboard and/or mouse or other suitable operator input device. Processor 122 is optional in the sense that functions performed by it can be performed by IDM 110. Monitor 124 may, for example, be a CRT or LCD screen. Preview station 120 provides its output, as described below, back to IDM 110 through network connection 116. Printer 130 may, for example, be a high speed color laser printer which prints image signals received from IDM 110 (or from preview station 120) on a light sensitive photographic paper web. Exposed photographic paper from printer 130 is then developed in color paper developer 140 to yield fixed images on the paper, in a known manner. The web, following developing in developer 140 is transported to a finishing station 160 at to which the scanned film 19 is also sent. At finishing station 160 the paper web is cut into individual image prints, the film 19 is cut into strips (for 35 mm film) or reinserted into a cassette 10 (for Advanced Photo System film), and the prints mated with the corresponding film to complete the customer's order.

It will be appreciated that in the present invention, image signals may be obtained from other than from a scanned photographic media. For example, image signals might be provided to IDM 110 by being read from floppy disks 110, CD-ROMS 112 or received from the Internet over communication channel 113. Such image signals can be handled by IDM 110 and preview station 120 in the same manner as image signals received from scanned photographic media.

Figure 3:
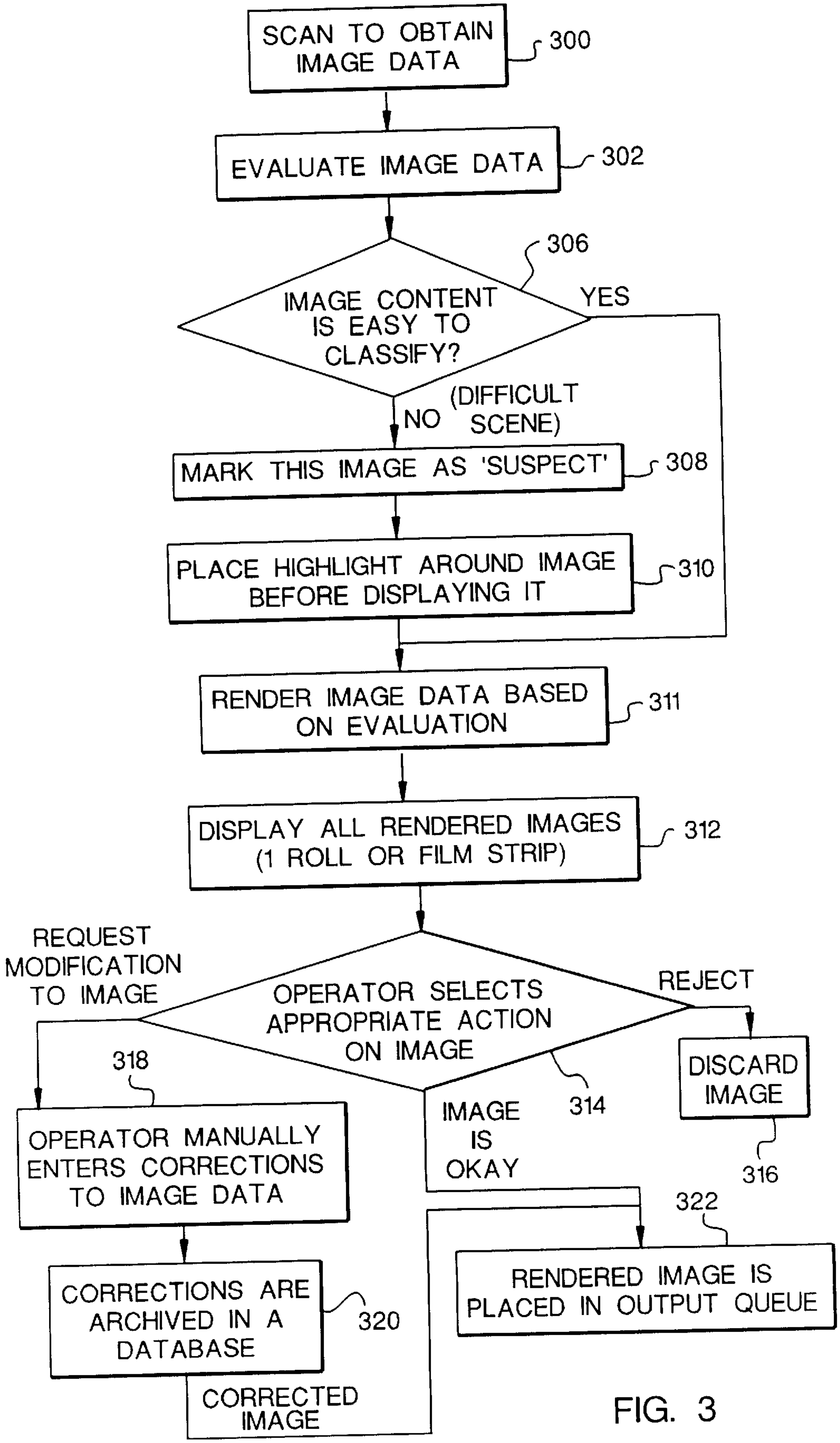
FIG. 3 is a flowchart illustrating a method of the present invention.

Turning now to FIG. 3, a method which can be executed on the apparatus of FIG. 1 is illustrated. It will be assumed that each film 19 has already been formed at splicer 100 by attaching individual customer order filmstrips 12*a*, 12*b*, 12*c*, and developed in developer 20, as described above. Next then, film 19 is scanned (300) on high speed scanner 102. Images of a filmstrip 12*a*, 12*b*, 12*c* in an order (again, one filmstrip 12*a*, 12*b*, 12*c* typically being one order) are continuously scanned one after the other in the sequence in which they occur on the filmstrip 12*a*, 12*b*, 12*c*, to produce corresponding image signals. Filmstrips 12*a*, 12*b*, 12*c* on film 19 are continuously scanned one after the other in the order in which they are attached together in film 19. The image signals are sent over network node 104 to IDM 110. IDM 110 is programmed to automatically (that is, without operator intervention) evaluate (302) one or more characteristics of each image based on the received image signal. In this evaluation step the characteristics of an image are compared with one or more predetermined characteristic values (which may be numerical or relative, for example in the form of a relationship with one or more other characteristics). Each image signal is then classified (306) as passed or suspect based on IDM 110 automatically comparing image signal characteristics with one or more predetermined characteristic values. Images with characteristics meeting or not meeting a set of one or more predetermined characteristic values, are classified as passed or suspect, respectively. For example, high contrast scenes, such as occur in a flash in the face (front lit) or back lit scenes, will normally not meet the predetermined characteristics since it is predetermined in advance that such images cannot be properly handled by automatic enhancement. In other cases the resultant output is objectionable to the consumer (too dark, too light, and the like). Such images would be classified as "suspect". IDM 110 will then automatically enhance (311) (that is, render as appropriate) each image particularly as may be appropriate taking into account characteristics of the intended output device(s). Note that by virtue of this step 311, both passed images and suspect images will be initially automatically enhanced.

The predetermined characteristic values are previously programmed at the factory, by an operator, or by remote programming from a remote terminal (the terminal being "remote" when typically it is at least in another room, another building, or even 1, 5 or more miles away from IDM 110). The characteristics can include, for example, image density, contrast, color balance, quality evaluation for scratches and dust, red eye, scene position and orientation, and the suitability of such image for a particular output device (e.g. (printer, CD-ROM, Video screen, etc.).

Figure 4:
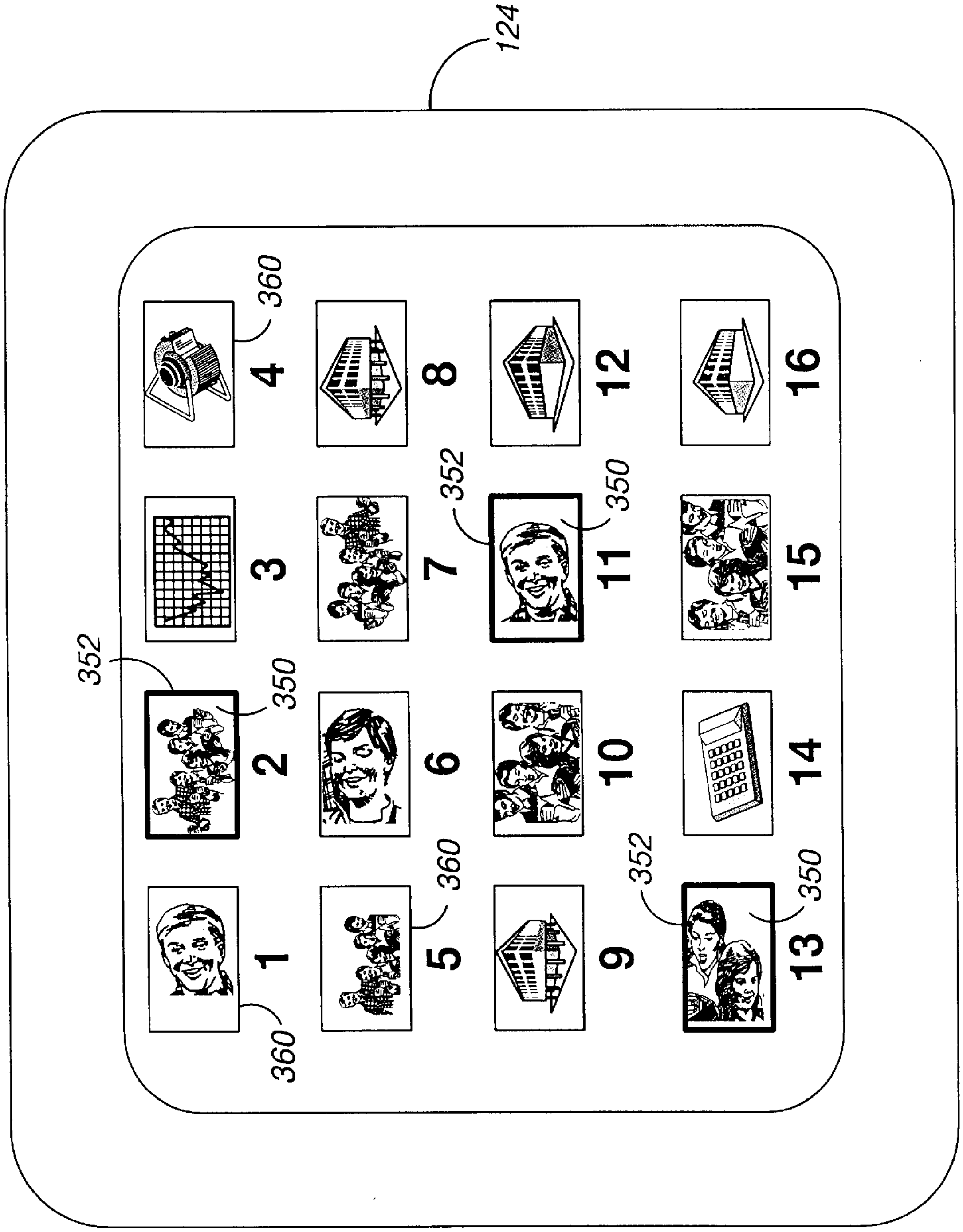
FIG. 4 illustrates a screen displaying suspect images in accordance with the method of FIG. 3.

Image signals for suspect images are marked (308) by a suitable identification (such as a particular code associated with the image signal). The added indicator may in particular be a code which causes processor 111 or processor 122 to add (310) a highlight (that is, a border) around the image before it is displayed on monitor 124. All image signals from a given order are then displayed (312), preferably simultaneously or sequentially as their image signals become available from scanner 102 or IDM 110, as simulated images on monitor 124. A typical screen produced on monitor 124 by this process is shown in FIG. 4. The simulated images corresponding to suspect images 350 will re readily apparent to an operator as suspect images given that they will have an added border 352 around each of them, whereas simulated images corresponding to passed images 360 will not have any such border. The identification of suspect images such that suspect images are apparent to an operator, could be done in many other ways. For example: the passed images could be 'grayed out' leaving the suspect images 'highlighted'; a use of various colors surrounding the suspect images (instead of a dark thick line, it could be a multi-color, or solid color box or line); the simulated suspect images could be 'flashing' on and off to draw the attention of the operator; the image frame numbers under the images could be highlighted a different color or treatment; and the like.

As film 19 is being scanned by scanner 102, an operator is observing monitor 124 of preview station 120. The operator can quickly judge the bordered suspect images and select an appropriate action (314) for each in turn, namely to discard a suspect image (316) as being unsuitable even after attempting to correct it, or to manually enter (318) corrections to the image through user input 126. Corrections to characteristics such as color balance, density, contrast, image rotation, cropping or re-positioning the center of a scene, can be readily accomplished by the operator using known software running on processor 122 or 110. During such correction procedures, processor 122 (or IDM 110) may allow the operator to zoom in on each suspect image in turn during the correcting. The user input is obtained or received by processor 122 (or IDM 110) which corrects each corrected suspect image in response to the operator input for correcting that image. The particular corrections made to the characteristics of each suspect image are stored (320) in a database along with the original characteristics of the uncorrected suspect image, for reasons discussed below.

Since all images are displayed at step 312, the operator has a chance to over-rule the classification of any image as passed or suspect and elect to treat it as a suspect or passed image respectively. In the former case, the operator may perform corrections (318) in the manner already discussed for any suspect image. Thus, such a display of all the images 16 from a given filmstrip 12, whether suspect or passed, allows for ready human intervention in the case where the predetermined characteristics used in step 306 are inadequate and would lead to incorrect results if simply applied automatically. In the greatest majority of cases though, images passed at step 306 will typically be left as passed by the operator at step 314.

Corrected suspect image signals and passed image signals are then placed (322) in an output queue for forwarding to one or more output devices, in particular printer 130 and/or media output device 111. Images rejected in step 314 need not be forwarded to the output queue and can be deleted from storage if desired. The image data of the queue, along with the database produced in step 320, can be stored in any one or more suitable memory devices, such as magnetic or optical disk or tape (preferably rewriteable) or solid state random access memory ("RAM").

The above procedure is repeated for all images 16 in each filmstrip 12*a*, 12*b*, 12*c* in film 19, in the same sequence that they are scanned by scanner 102. However, although the foregoing processing of FIG. 3 could be altered in sequence, if desired, with image signals obtained from one scanned filmstrip 12*a*, 12*b*, 12*c* being saved in storage accessible by processor 100, while image signals obtained from another scanned filmstrip are processed according to FIG. 3.

As an alternative to the method shown in FIGS. 1 and 3, printer 130 could be an optical printer instead of a digital printer. In such a case, film 19, following scanning in scanner 102 would be physically transferred to printer 130 (as indicated by arrow 103). Each image would then be optically printed (output) onto the photographic paper web, using only settings from IDM 110 which are based on the characteristic data for the image obtained from the corresponding image signal from scanner 102 (for passed images), or based on corrected characteristics obtained from preview station 120. In such situation, scanner 102 would not need to provide as high a resolution described above. Further, corrected characteristics from preview station 120 could be passed directly to printer 130 through a direct communication link 127.

Figure 5:
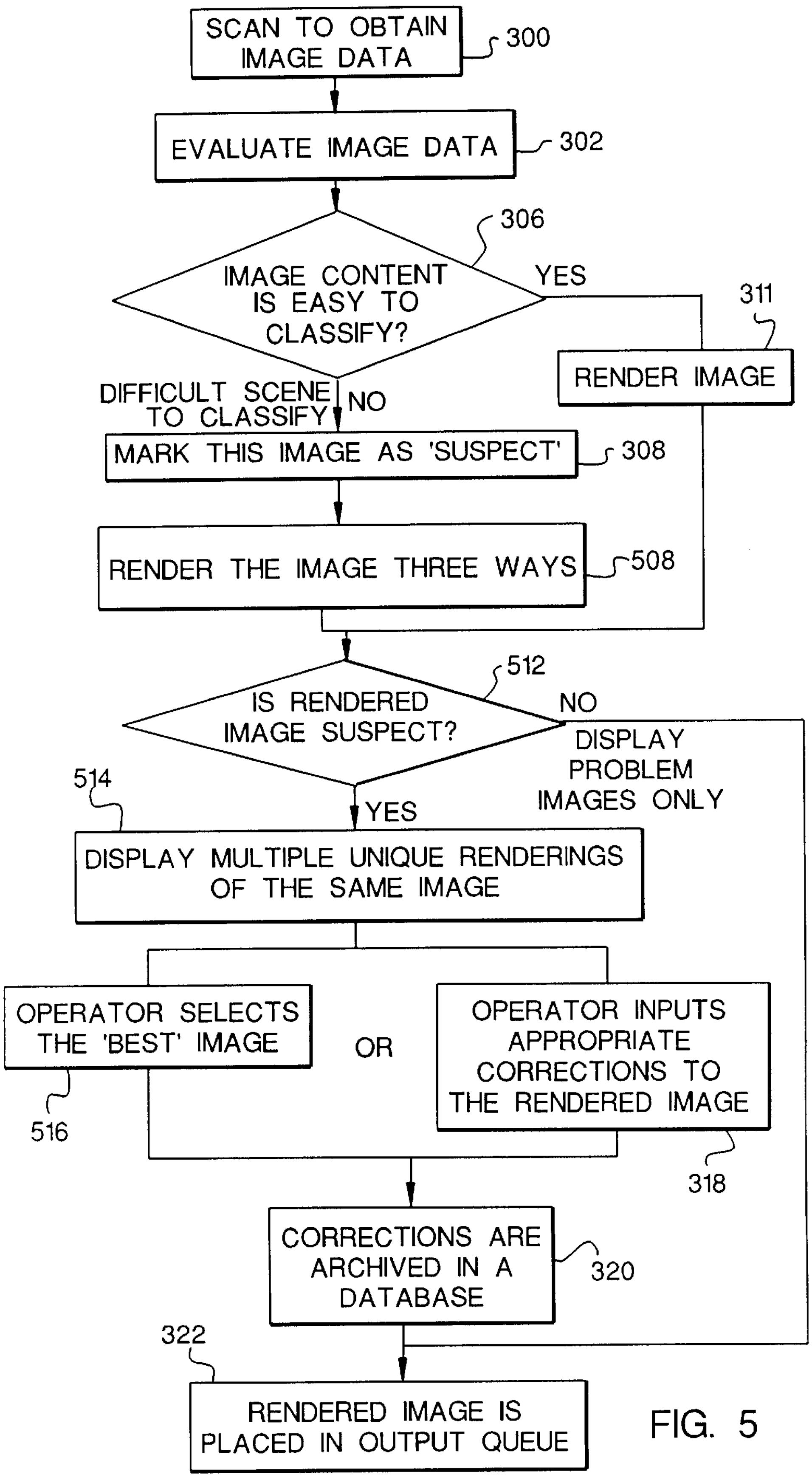
FIG. 5 is a flowchart illustrating another method of the present invention in which suspect images are displayed with suggested corrections.
Figure 6:
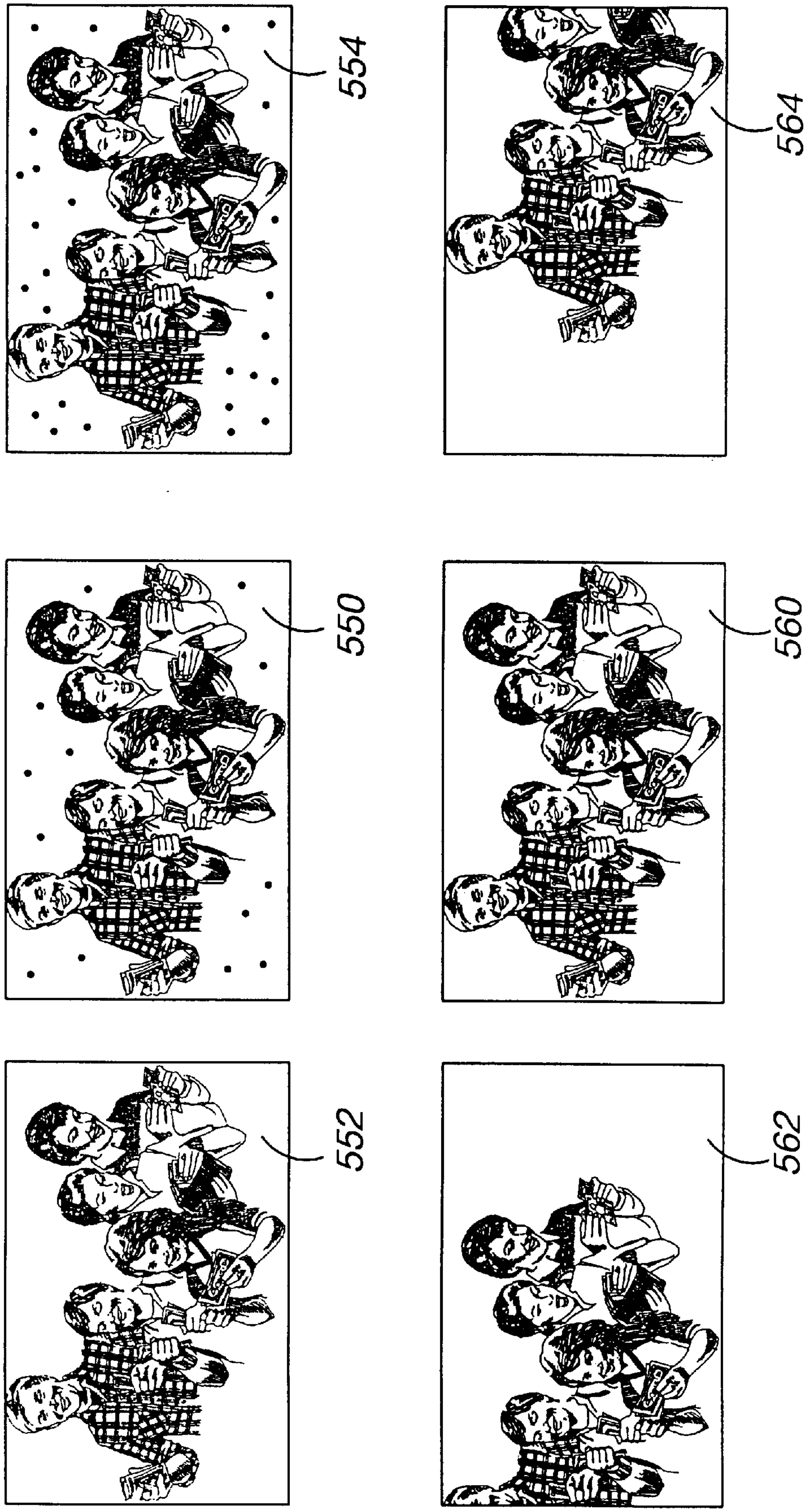
FIG. 6 illustrates two different screens displaying suspect images in accordance with the method of FIG. 5, each showing a suspect image displayed with two different suggested corrections.

FIG. 5 shows an alternate embodiment of the method of the present invention, in which one or more suggested corrected images are displayed for each suspect image. In this method, images passing classification 306 are automatically processed (enhanced for a given output device) using a predetermined set of standard classifications (311). However, images classified as suspect are automatically enhanced (508) in a number of different ways. First, each is enhanced using the same classification used in step 311 for passed images. Second each is enhanced around a predetermined set point that is noticeably different than the standard classification in step 311 (for example, a density correction is provided to produce a darker print, or a color balance altered). Third, the image can be automatically enhanced at a set point different from the previous two enhancements. If an image is considered suspect (512) (as a result of having been marked as suspect in step 308) then all three of those automatically enhanced (rendered) image signals are displayed on monitor 124 for each such image of a given order, as suggested corrected images. FIG. 6 illustrates such a display. In FIG. 6 simulated suspect image 550 is displayed on monitor 124 after standard automatic enhancing along with two suggested corrected images 552, 554 which are lighter and darker, respectively, than image 550. Similarly, simulated suspect image 560 is displayed along with two suggested corrected images 562, 564 which are re-centered with a right and left shift, respectively. On the other hand, for passed images rendered at step (311), those images will simply be placed in the output queue (322).

Following the display such as shown in FIG. 6, the operator may provide user input for the suspect image by either simply selecting (516) what she considers to be the best rendered image, or alternatively the operator manually inputs corrections (318), then proceeds to the next suspect image. Monitor 124 will provide a display confirming election of the best rendered image or input corrections. The selections or corrections are saved (320) to a file in the same manner as described in connection with FIG. 3. The process is repeated until the entire film 19 has been scanned and the inspection of images is completed.

Figure 7:
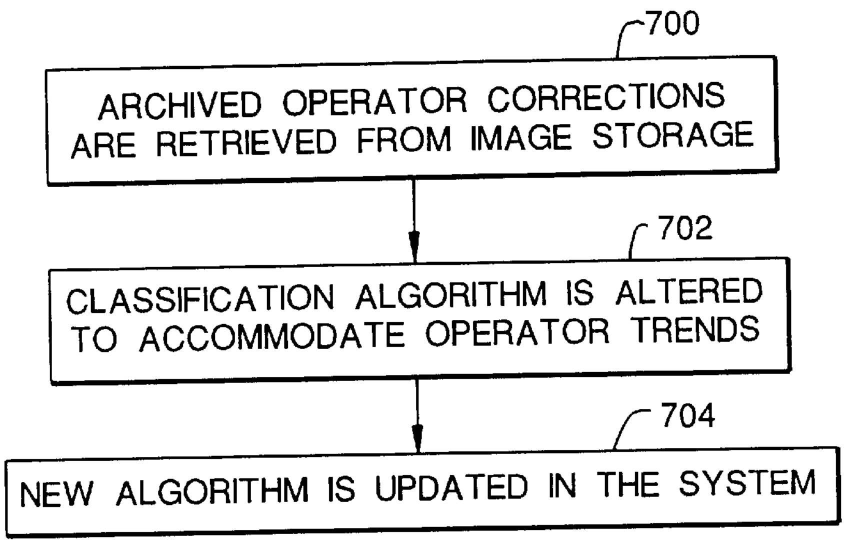
FIG. 7 is a flowchart illustrating a method of the present invention in which operator corrections of suspect images are incorporated into preselected parameters used to automatically screen scanned images or enhance passed images.

FIG. 7 illustrates an embodiment of the method in which preselected parameters for determining passed or suspect images are modified in response to user input corrections for failed images. This procedure, over time then, utilizes the operator correction data to improve the classification algorithm. In particular, each of the corrections the operator makes at this preview station are saved during step 320 as described above, to be used later by the classification algorithm. The corrections for a specific number of images will be collected (time based or quantity based) and retrieved (700) by an image analysis algorithm run by IDM 110. The image analysis algorithm will identify 'patterns & trends' and will 'learn' the types of corrections the operators applied to certain scenes. The type of corrections will be factored into altering (702) the image evaluation algorithm to therefore produce (704) a new classification algorithm. Similarly, the patterns and trends could be factored into the rendering in step 311. Over time then, higher quality image signals will be obtained which could eventually reduce the need for the preview operation. The image evaluation algorithms can be 'tuned' based on the preview operator's input to match seasonal and regional preferences to minimize future makeovers. Note that while such altering of the image evaluation algorithm could be done after each operator correction, it is preferred that it is only done after a plurality of such corrections have been saved. If the altering was done after each operator correction, corrections based on a single peculiar image could adversely affect the algorithms.

The methods of the present invention allow flexibility in queuing images and hence allow good use of resources. For example, it is not necessary that IDM 110 wait until a corrected image signal for a suspect image in an order becomes available. Instead IDM 110 can continue to forward passed images to an output device (such as printer 130 or output station 111) from a given order until either the corrected image signal is available from preview station 120 (at which point it can be forwarded to the output device) or until all images of the order are forwarded to the output device. In this manner the output device is not held up since in many cases, by the time all passed images for a given order are sent to the output device, a corrected image signal for the same order may be available. However, if by the time all passed image signals of a given order have been sent to the output device but a corrected image signal for that order has not yet become available from preview station 120, a number of options can be executed.

In one option, IDM 110 simply does not forward any further image signals from other orders until the one or more corrected image signals for that order are received and forwarded to the output device. This option has the advantage of ensuring that all images of an order are output together without being interrupted by images from another order. This is particularly important in the case where the output device is a printer such as printer 130 since if printed images from a given order are interspersed with printed images of another order, some means of sorting the printed images will then have to be provided. However, this option results in the output device, such as printer 130, sitting unused during the wait for the corrected image signal of an order.

Figure 8:
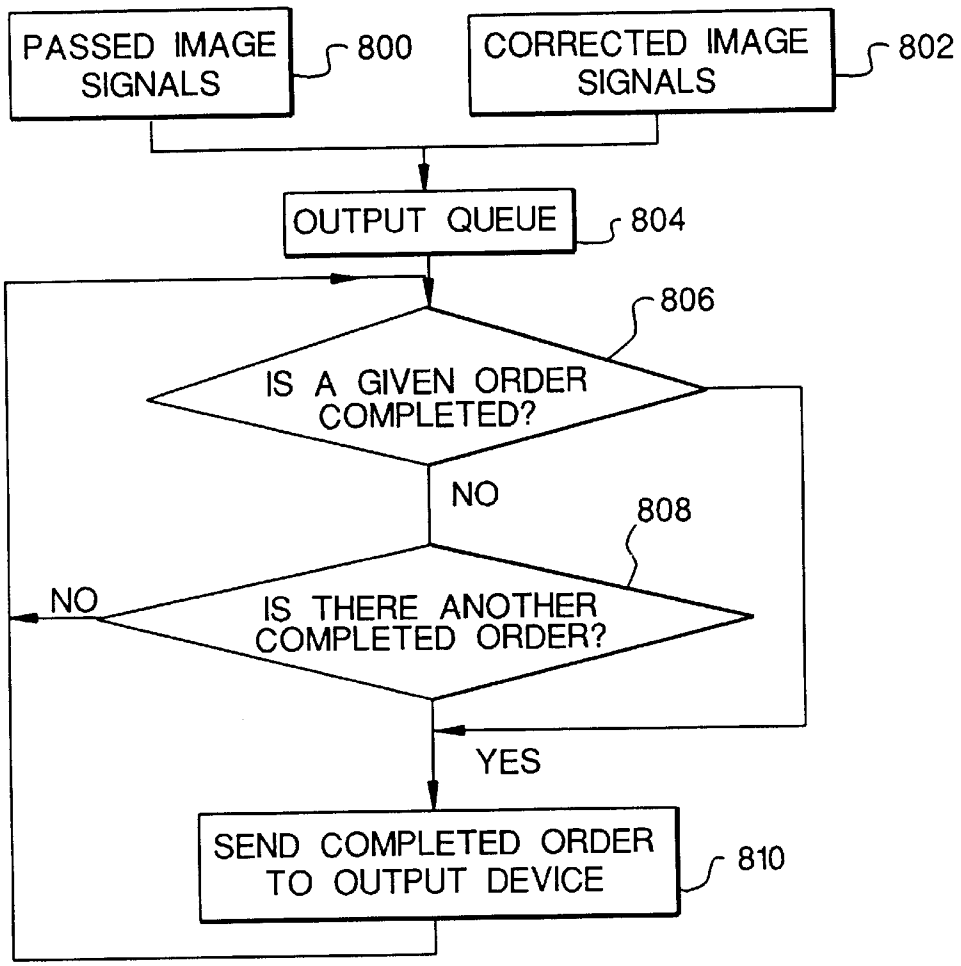
FIG. 8 is a flowchart illustrating a particular queuing aspect of a method of the present invention To facilitate understanding, identical reference numerals have been used, where possible, to designate identical elements that are common to the figures.

In a second option, image signals from a first order are forwarded to an output device only when all passed and corrected image signals for the first order have been obtained. In the meantime any passed or corrected image signals for that first order are simply stored. In this option, while awaiting corrected image signals for the first order, image signals for a second order are forwarded to the output device for which second order all passed and corrected image signals have been obtained. That is, if a first order is not completely ready for output, another completely ready order, if available, is sent to the output device first. This procedure is illustrated in FIG. 8. Passed image signals (800) and corrected image signals (802) are received (804) into the output queue with an added identification from scanner 102 which indicates which order a given image signal is from and how many image signals are associated with each order. When an image in an order is rejected (316) this information is tracked by IDM 110 also. IDM 110 checks the status (806) of each order to see if it is complete (that is, have all passed and corrected image signals for that order been received). If the order is complete, it is forwarded (810) to the output device. If it is not complete, IDM 110 checks (808) for another complete order in storage and, if found, that second complete order is forwarded (810) to the output device. If no completed order is found or a completed order was forwarded to the output device, the cycle is repeated until all orders on film 19 have been completed and forwarded to the output device. This second option has the advantage that since most orders will have corrections which can be rapidly completed but some will have more troublesome and time consuming operator corrections required, the output device (for example, printer 130) will not likely be left sitting idle for any substantial period and hence high throughput of images 16 is obtained. However, this option will typically require that IDM 110 have access to a larger storage area since one or more almost completed or completed orders may need to be stored at any given time.

It will be understood that other variations and modifications can be effected within the spirit and scope of the invention. Accordingly, the present invention is not limited to such specifically described embodiments.

What is claimed is:

1. A method of processing photographic media carrying a plurality of images, the method comprising the steps of:

(a) scanning the media to obtain scanned image signals corresponding to the images;

(b) determining image characteristics from the scanned image signals;

(c) automatically comparing the image characteristics for the scanned images with one or more predetermined characteristic values to classify as passed or suspect images those images which do or do not meet one or more of the predetermined characteristics;

(d) displaying simulated images based on the scanned image signals such that any suspect images are apparent to a user;

(e) receiving user input for any suspect images;

(f) correcting any suspect image signal in response to the user input for that image; and (g) forwarding the image signals to an output device;

wherein in said step (d), both suspect images and passed images are displayed, and wherein suspect images are displayed with an added indicator which distinguishes them to a user from passed images.

2. A method according to claim 1 additionally comprising automatically enhancing passed images by processing passed image signals in accordance with preselected parameters.

3. A method according to claim 1 additionally comprising for a suspect image, generating one or more suggested corrected images and displaying the suggested corrected images.

4. A method according to claim 1 wherein the added indicator is a border.

5. A method according to claim 1 wherein in step (g), the image signals are forwarded to a printer for printing on a substrate.

6. A method of processing photographic media carrying a plurality of images, comprising:

(a) scanning the media to obtain scanned image signals corresponding to the images;

(b) determining image characteristics from the scanned image signals;

(c) automatically comparing the image characteristics for the scanned images with one or more predetermined characteristic values to classify as passed or suspect images those images which do or do not meet one or more of the predetermined characteristics;

(d) displaying simulated images based on the scanned image signals such that any suspect images are apparent to a user;

(e) receiving user input for any suspect images;

(f) correcting any suspect image signal in response to the user input for that image; and (g) forwarding the image signals to an output device;

wherein the predetermined characteristic values are values selected from image density, contrast, color balance, quality evaluation for scratches and dust, red eye, scene position and orientation.

7. A method of processing photographic media carrying a plurality of images, the method comprising the steps of:

(a) scanning the media to obtain scanned image signals corresponding to the images;

(b) determining image characteristics from the scanned image signals;

(c) automatically comparing the image characteristics for the scanned images with one or more predetermined characteristic values to classify as passed or suspect images those images which do or do not meet one or more of the predetermined characteristics;

(d) displaying any simulated images based on the scanned image signals such that suspect images are apparent to a user;

(e) receiving user inputs for a suspect image;

(f) correcting a suspect image signal in response to the user input for that image; and (g) forwarding an image from an image signal corresponding to a passed image scanned subsequent to an earlier scanned suspect image while waiting for the corrected image signal from step (f) which corresponds to that earlier scanned suspect image.

8. A method according to claim 7 wherein in step (g) images from passed image signals continue to be forwarded to the output device until the corrected image signal from step (f) is available or all images on the media have been scanned.

9. A method according to claim 7 wherein the output device is a printer.

10. A method according to claim 7 additionally comprising automatically enhancing passed images by processing passed image signals in accordance with preselected parameters.

11. A method according to claim 10 additionally comprising modifying the preselected parameters applied to passed images in response to user inputs for suspect images.

12. A method of processing photographic film comprised of a batch of film orders each of one or more filmstrips carrying a series of images, the filmstrips of the batch being attached in series at their ends, the method comprising the steps of:

(a) scanning the film to obtain scanned image signals corresponding to the images;

(b) determining image characteristics from the scanned image signals;

(c) automatically comparing image characteristics for the scanned images with one or more predetermined characteristic values to classify as passed or suspect images those images which do or do not meet one or more of the predetermined characteristics;

(d) displaying simulated images based on the scanned image signals such that suspect images are apparent to a user;

(e) receiving user inputs for one or more suspect images;

(f) correcting a suspect image signal in response to the user input for that image; and (g) forwarding image signals from passed images of an order to the output device until the corrected image signal from step (f) is available or all passed image signals of an order have been forwarded.

13. A method according to claim 12 wherein after all image signals from passed images of an order have been forwarded to the output device, the corrected image signal from step (f) is forwarded to the output device prior to image signals from another order being forwarded to the output device.

14. A method according to claim 12 wherein the output device is a printer.

15. A method of processing photographic film comprised of a batch of film orders each of one or more filmstrips carrying a series of images, the filmstrips of the batch being attached in series at their ends, the method comprising the steps of:

(a) scanning the film to obtain scanned image signals corresponding to the images;

(b) determining image characteristics from the scanned image signals;

(c) automatically comparing the image characteristics for the scanned images with one or more predetermined characteristic values to classify as passed or suspect images those images which do or do not meet one or more of the predetermined characteristics;

(d) displaying simulated images based on the scanned image signals such that suspect images are apparent to a user;

(e) receiving user inputs for one or more suspect images;

(f) correcting a suspect image signal in response to the user input for that image; and (g) forwarding image signals from a first order to an output device only when all passed and corrected image signals for the first order have been obtained, and while awaiting corrected image signals for the first order, forwarding image signals for a second order to the output device for which second order all passed and corrected image signals have been obtained.

16. A method according to claim 15 wherein the first order was scanned before the second order.

17. A method according to claim 16 wherein the output device is a printer.

18. An apparatus for processing photographic media carrying a plurality of images, comprising:

(a) a scanner to scan the media and obtain scanned image signals corresponding to the images;

(b) a screen;

(c) a user input device;

(d) an output device; and (d) a processor communicating with the scanner, display, user input device, and output device, which processor:

determines image characteristics from the scanned image signals;

automatically compares the image characteristics for the scanned images with one or more predetermined characteristic values to classify as passed or suspect images those images which do or do not meet one or more of the predetermined characteristics;

generates simulated images and causes them to be displayed on the screen based on the scanned image signals such that suspect images are apparent to a user;

receives user inputs for one or more suspect images;

corrects a suspect image signal in response to the user input for that image; and forwards the image signals to an output device.

19. An apparatus according to claim 18 wherein the processor additionally automatically enhances passed images by processing passed image signals in accordance with preselected parameters.

20. An apparatus according to claim 19 wherein the processor additionally generates one or more suggested corrected images and causes the suggested corrected images to be displayed on the screen.

21. An apparatus according to claim 19 wherein the processor additionally modifies the preselected parameters applied to passed images in response to user inputs for one or more suspect images.

22. An apparatus according to claim 21 wherein the processor modifies the preselected parameters only in response to user inputs for a plurality of suspect images.

23. An apparatus according to claim 18 wherein the processor causes simulated images to be displayed only for suspect images.

24. An apparatus according to claim 18 wherein the processor adds an indicator to suspect images and causes both suspect images with the added indicator and passed images to be displayed on the screen, such that suspect images are distinguished to a user from passed images.

25. An apparatus according to claim 18 wherein the added indicator is a border.

26. An apparatus according to claim 18 wherein the output device is a printer.

27. An apparatus according to claim 18 wherein the predetermined characteristic values are values selected from image density, contrast, color balance, quality evaluation for scratches and dust, red eye, scene position and orientation.

28. An apparatus according to claim 18 wherein the processor forwards to the output device, an image signal corresponding to a passed image scanned subsequent to an earlier scanned suspect image while waiting for the corrected image signal from step (f) which corresponds to that earlier scanned suspect image.

29. An apparatus according to claim 18 wherein the processor forwards passed image signals to the output device, while available, until the corrected image signal from step (f) is available.

30. An apparatus for processing photographic film comprised of a batch of film orders each of one or more filmstrips carrying a series of images, the filmstrips of the batch being attached in series at their ends, the apparatus comprising:

(a) a scanner to scan the film and obtain scanned image signals corresponding to the images;

(b) a screen;

(c) a user input device;

(d) an output device; and (d) a processor communicating with the scanner, display, user input device, and output device, which processor:

determines image characteristics from the scanned image signals;

automatically compares the image characteristics for the scanned images with one or more predetermined characteristic values to classify as passed or suspect images those images which do or do not meet one or more of the predetermined characteristics;

generates simulated images and causes them to be displayed on the screen based on the scanned image signals such that suspect images are apparent to a user;

receives user inputs for one or more suspect images;

corrects a suspect image signal in response to the user input for that image; and continues to forward to the output device one or more image signals from passed images of an order until either a corrected image signal is available or all of the images of an order have been scanned.

31. An apparatus according to claim 30 wherein the processor continues to forward image signals from a first order to an output device only when all passed and corrected image signals for the first order have been obtained, and while awaiting corrected image signals for the first order, forwards image signals for a second order to the output device for which second order all passed and corrected image signals have been obtained.

32. A method of processing captured images comprising the steps of:

(a) determining image characteristics from image signals representative of the captured images;

(b) automatically comparing the image characteristics for the images with one or more predetermined characteristic values to classify as passed or suspect images those images which do or do not meet one or more of the predetermined characteristics;

(c) displaying simulated images based on the image signals such that any suspect images from the displayed simulated images are apparent to a user;

(d) receiving user input for any suspect images;

(e) correcting any suspect image signal in response to the user input for that image; and (f) forwarding the image signals to an output device.

* * * * *